United States Patent [19]

Silverbush

[11] Patent Number: 4,685,126
[45] Date of Patent: Aug. 4, 1987

[54] TELEPHONE PAY STATION AND CIRCUIT THEREFOR

[75] Inventor: Jerome Silverbush, Massapequa, N.Y.

[73] Assignee: New York Telephone Company, New York, N.Y.

[21] Appl. No.: 814,217

[22] Filed: Dec. 27, 1985

[51] Int. Cl.$^4$ ............................................. H04M 17/00
[52] U.S. Cl. ....................................... 379/146; 379/155
[58] Field of Search ................ 179/6.3 R, 6.31, 7.1 R; 379/143, 145, 146, 150, 155

[56] References Cited

U.S. PATENT DOCUMENTS

| | | | |
|---|---|---|---|
| 4,063,036 | 12/1977 | Hunsicker | 379/36 |
| 4,136,262 | 1/1979 | Clark, Jr. | 379/146 |
| 4,186,275 | 1/1980 | Burns | 379/150 |
| 4,198,545 | 4/1980 | Haist et al. | 379/132 |

*Primary Examiner*—Gene Z. Rubinson
*Assistant Examiner*—Mark E. Ham
*Attorney, Agent, or Firm*—John Jordan; John J. Torrente

[57] ABSTRACT

A telephone pay station wherein a disconnect circuit is provided for disconnecting the pay station from the central office in response to the coin collect signal generated at the central office.

19 Claims, 2 Drawing Figures

TELEPHONE PAY STATION AND CIRCUIT THEREFOR

BACKGROUND OF THE INVENTION

This invention relates to telephone pay stations and, in particular, to telephone pay stations adapted to permit a caller to place a call anywhere in a given locale for a limited time for a specified amount of money.

Telephone pay stations of the above tyoe and the service provided thereby shall be referred to herein as "call anywhere limited time" pay stations and service, respectively. Telephone companies in various locations have offered this type of service through specifically designated telephone pay stations for some time. Thus, for example, in New York City, telephone pay stations labelled "30 Second Telephones" permit a caller to call any of a variety of locations in New York State for a 30 second time period for $0.25.

These call anywhere limited time pay stations were initially connected into the telephone network through the tip and ring lines emanating from central offices employing electro-mechanical switching equipment and, in particular, equipment known as the No.1 XBar. Since the No.1 XBar had an initial calling period which could be sent at the lowest to 5 minutes, it was necessary to adapt this system to terminate calls at a lesser interval (e.g., as above-indicated, after 30 seconds) so as to be usable with the call anywhere pay stations. With the No.1 XBar system this could be readily accomplished with a timer located in the central office and set to terminate a call at the desired lesser interval.

With the retirement of the No.1 XBar system in favor of the No.1 electrcnic switching system (No.1 ESS), which is program controlled, the ability to use a timer for this purpose was no longer available. Furthermore, to reprogram the No. 1 ESS for this type of capability (i.e., to provide a call period of less than the lowest presently programmable initial call period of 1 minute) would be overly complicated and expensive.

It is therefore an object of the present invention to provide a call anywhere limited time telephone pay station which could be used with central offices emoloying electronic switching systems.

It is a further object of the present invention to provide a call anywhere limited time pay station which could be used with central offices employing electronic switching systems whose lowest initial call period is greater than the call period of the pay station.

It is yet a further object of the present invention to provide a call anywhere limited time pay station having a call period of less than 1 minute and usable with electronic switching systems having a lowest initial call period of 1 minute.

SUMMARY OF THE INVENTION

In accordance with the principles of the present, the above and other objectives are realized by incorporating in a call anywhere limited time pay station a circuit for disconnecting the pay station from the incoming ring line from the central office for a sufficient time to simulate or indicate to the central office an on-hook condition. More particularly, in further accord with the invention, the disconnect circuit is made responsive to the coin collect signal generated by the electronic switching system and coupled to the pay station on the tip line, which is connected to a central office. This signal is generated by the switching system to instruct the pay station to collect the money deposited when initiating the call.

Since the coin collect signal is transmitted a considerable time prior to the particular initial calling period programmed into the switching system (as above-indicated, the lowest period presently programmable for the No.1 ESS is 1 minute), the pay station of the invention is conditioned by the disconnect circuit to terminate a call prior to the programmed initial calling period. If the system is set at its lowest initial calling period of 1 minute, the pay station will terminate a call considerably prior to 1 minute and within the approximate time of 30 to 50 seconds after a call is connected.

In the embodiment of the invention to be disclosed hereinafter, the disconnect circuit includes a switch having a movable, coil activated contact connected between the ring line and a terminal of the pay station. A diode circuit and capacitor connected to the tip line control the current through the coil and are responsive only to the coin collect signal. Upon the appearance of this signal on the tip line, current flows through the coil opening the switch contact and, therefore, the ring path to the central office. The contact is then held open by discharge of the capacitor through the coil for sufficient time to simulate an on-hook condition to the central office.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
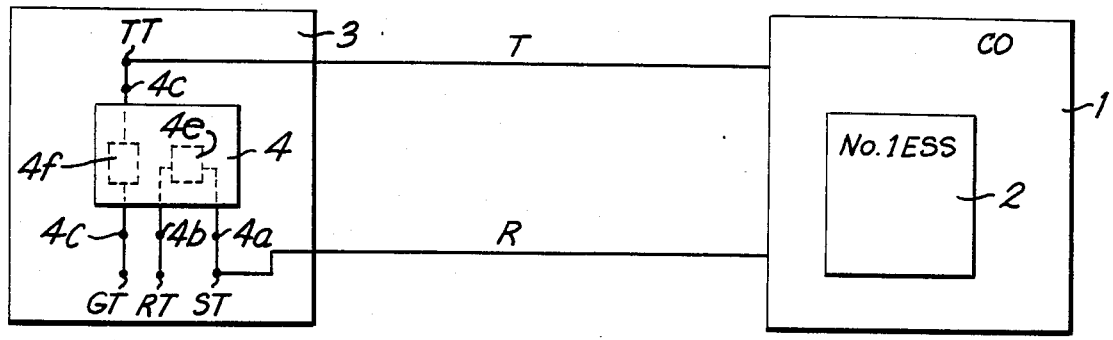
FIG. 1 shows schematically a telephone pay station in accordance with the principles of the present invention.

In. FIG. 1, a central office CO 1 comprising an electronic switching system 2, shown as a No.1 ESS, is connected via tip and ring lines T and R to a telephone call anywhere limited time pay station 3 which is adapted to accept a predetermined amount of money, assumed for the present purposes to be twenty-five cents ($0.25), for initiating a call to anywhere in a predefined locale. The central office CO and the switching system 2 recognize the pay station 3 as a call anywhere station and cooperate therewith to effect calls from the station to anywhere in the predefined locale.

As is known, the No.1 ESS has certain existing initial calling periods which can be programmed into the system. It is also known that the lowest calling period presently programmable is 1 minute. Accordingly, with the present capability of the No.1 ESS a call initiated at the station 3 cannot be terminated before at least 1 minute has elapsed.

In accordance with the present invention, the pay station 3 is further adapted to include a disconnect circuit 4 which causes termination of the call from pay station 3 prior to the programmed initial calling period of the switching system 2, thereby allowing the call period for the pay station to be less than 1 minute. In further accord with the invention, the disconnect circuit 4 is enabled to effect call termination by the usual coin collect signal generated by the switching system 2. This signal is generated by the system 2 based upon the programmed initial calling period of the system and enables the pay station 3 to collect the deposited money.

Since the coin collect signal for the 1 minute initial calling period of the No.1 ESS is considerably less than 1 minute, i.e., is generated from between 30 to 50 seconds after a call is initiated, depending upon various conditions of the system 2, the disconnect circuit 3 will respond to and terminate the call within the aforesaid period and, therefore, prior to the 1 minute initial calling period. Accordingly, by utilizing the disconnect circuit 4 and the already existing coin collect signal, a simple procedure for setting a shortened calling period for the station 3 than otherwise allowable by the switching system 2 is effected.

As shown in FIG. 1, the disconnect circuit 4 has first, second, third and fourth terminals 4a, 4b, 4c and 4d. The terminal 4a is connected directly to the ring line R via connection to a spare terminal ST on the station 3. The terminal 4b, in turn, is connected to the usual ring terminal RT of the station 3 (i.e., the terminal to which ring line R is normally connected). The terminal 4c is then connected to the usual tip terminal TT of the station 3, as is the tip line itself.

Connecting the terminals 4a and 4b of the circuit 4 is a switch 4e. The switch 4e is activated by an activating circuit 4f connected between the terminal 4c and the terminal 4d of the circuit 4. The terminal 4d, in turn, is connected to the usual ground terminal GT of the station 3.

In operation, after a call has been initiated and is in progress at the pay station 3, the switching system 2 generates the usual coin collect signal to collect the money deposited at the pay station when initiating the call. This signal is typically a D.C. pulse of 130 volts, and 500 msec duration. This coin collect signal, as explained above, is generated prior to the expiration of the programmed calling period set at the system 2, and, in the case of the lowest initial calling period of 1 minute, between 30-50 seconds after a call is in progress.

The activating circuit 4f is adapted to respond to this signal only and, in response thereto, opens the switch 4e, thereby disconnecting the terminal 4b and, hence, ring terminal RT and pay station 3 from the terminal 4a and, hence, the ring line R. The switch 4e is held open disconnecting the ring line R from the pay station 3 for a sufficient period that the central office CO registers or sees an on-hook condition.

The central office CO then responds to this condition by terminating the call.

Figure 2:
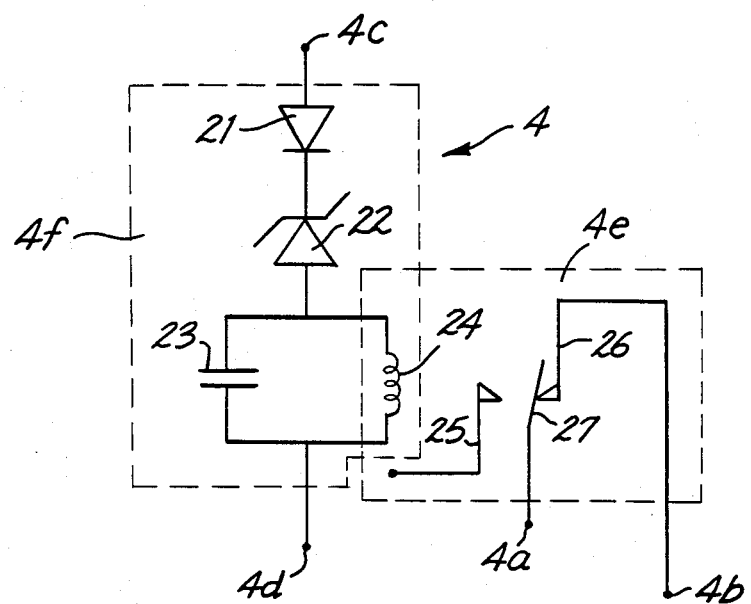
FIG. 2 illustrates the disconnect circuit of the pay station of FIG. 1 in greater detail.

FIG. 2 shows the details of a specific disconnect circuit capable of functioning as the circuit 4. The activating circuit 4f comprises a first diode 21 having a first end connected to the terminal 4c and poled in a direction away from the latter terminal. The other end of the diode 21 connects to a first terminal of a Zener diode 22. The latter diode 22 is poled in the direction of the diode 21 and has its second terminal connected to a parallel network of a capacitor 23 and a coil 24. The other end of this network is connected to the terminal 4d.

The coil 24 also forms part of the switch 4e, which, in the case shown, is a coil activated relay and further includes stationary contacts 25 and 26, and movable contact 27. The latter movable contact is, in turn, connected to terminal 4a, while the stationary contact 26 is connected to terminal 4b.

Operation of the circuit of FIG. 2 is as follows. Upon occurrence of the coin collect signal (130 volt, positive 500 msec D.C. pulse), the combination of diodes 21 and 22 is made conductive, thereby causing current to flow through capacitor 23 and coil 24. The current through coil 24 induces contact 27 to move from contact 26 to contact 25, thus opening the circuit path between terminals 4b and 4a. After termination of the coin collect signal, current continues to be fed through the coil 24 via discharge of the capacitor 23 to maintain the contact 27 at the contact 25. The contact 27 is thus retained in this position (and the ring line disconnected from pay station 3) for the period of both the coin collect signal and the capacitor discharge. By appropriate selection of the capacitor 23, this total period is made sufficiently long that the aforementioned on-hook condition is recognized at the central office CO. Typically, this period is made equal to about 4 seconds.

A particular group of circuit components found usable for the elements 21-27 are as follows: diode 21—Motorola IN4004 rectifier diode; diode 22—Motorola IN5370 B, 56V, 5W Zener diode; capacitor 23—Sprauge 53D-21ZG035GJ6, 2100 uf, 35WVDC capacitor; coil 24 and contacts 25 to 27—CP Clare HGSM51111N00 mercury wetted contact relay.

It should be noted that while the disconnect circuit 4 of the invention has been illustrated in use with a pay station 3 connected to a central office CO employing a No.1 ESS, it can also be used with central offices employing other electronic switching systems such as, for example, the No. 1A ESS.

In all cases it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A telephone pay station of a type in which a predetermined amount of money or coinage is deposited for initiating and paying for a telephone call and the pay station is adapted to be connected via tip and ring lines to a central office containing an electronic switching system which is programmed to provide an initial calling period for the predetermined amount of money or coinage and which, prior to the end of the initial calling period, transmits over the tip line a coin collect signal for instructing the pay station to collect the deposited money or coinage, the telephone pay station comprising:

a first terminal for connecting said pay station to said tip line;

a second terminal for connecting said pay station to said ring line;

and disconnect circuit means connected to said first and second terminals and adapted to be responsive to said coin collect signal for disconnecting said second terminal from said ring line for a preselected amount of time sufficient to indicate an on-hook condition to said central office.

2. A telephone pay station in accordance with claim 1 wherein:

said disconnect circuit means includes: a switch means connected to said second terminal and adapted to be connected to said ring line; and activating means connected to said first terminal for opening said switch means in response to said coin collect signal.

3. A telephone pay station in accordance with claim 1 wherein:

said pay station includes third and fourth terminals;

and said disconnect circuit means includes: fifth, sixth, seventh and eighth terminals connected to said first, second, third and fourth terminals, respectively; a switch having first and second stationary contacts, a third contact movable between said first and second stationary contacts, and a coil for activating said movable contact, the second and third contacts being connected to the sixth and seventh terminals, respectively, and one end of said coil being connected to said eighth terminal; a first diode having first and second diode terminals and poled in the direction of said second diode terminal, said first diode terminal being connected to said fifth terminal; a second Zener diode having first and second Zener diode terminals and poled in the direction of said second Zener diode terminal, said second Zener diode terminal being connected to said second diode terminal and said first Zener diode terminal to the other end of said coil; and a capacitor connected across said coil.

4. A telephone pay station in accordance with claim 3 wherein:

said fourth terminal of said pay station is connected to ground;

and said third terminal of said pay station is adapted to be connected to said ring line.

5. A telephone pay station in accordance with claim 4 wherein:

said Zener diode is adapted to conduct only upon the appearance of said coin collect signal at said tip line 6. A telephone pay station in accordance with claim 1 wherein:

said initial calling period is the lowest initial calling period programmable into said electronic switching system.

7. A telephone pay station in accordance with claim 1 wherein:

said initial calling period is 1 minute from the connection of a call;

and said coil collect signal occurs about 30 to 50 seconds from the connection of a call.

8. In combination:

a telephone pay station in which a predetermined amount of money or coinage is deposited for initiating and paying for a teleohone call;

a central office including an electronic switching system which is programmed to provide an initial calling period for the predetermined amount of money or coinage deposited at the pay station and which prior to the end of the initial calling period transmits over the tip line connecting the central office to the pay station a coin collect signal for instructing the pay station to collect the deposited money or coinage;

and tip and ring lines connecting the central office to the pay station;

the telephone pay station further comprising:

a first terminal for connecting said pay station to said tip line;

a second terminal for connecting said pay station to said ring line;

and disconnect circuit means connected to said first and second terminals and adapted to be responsive to said coin collect signal for disconnecting said second terminal from said ring line for a preselected amount of time sufficient to indicate an on-hook condition to said central office.

9. The combination of claim 8 wherein:

said initial calling period is the lowest initial calling period programmable into said electronic switching system 10. The combination of claim 9 wherein:

said initial calling period is 1 minute from connection of a call;

and said coin collect signal occurs about 30 to 50 seconds from the connection of a call.

11. The combination of claim 8 wherein:

said disconnect circuit means includes: a switch means connected to said second terminal and adapted to be connected to said ring line: and activating means connected to said first terminal for opening said switch means in response to said coin collect signal.

12. The combination of claim 11 wherein:

said pay station includes third and fourth terminals;

and said disconnect circuit means includes: fifth, sixth, seventh and eighth terminals connected to said first, second, third and fourth terminals, respectively: a switch having first and second stationary contacts, a third contact movable between said first and second stationary contacts and a coil for activating said movable contact, the second and third contacts being connected to the sixth and seventh terminals, respectively, and one end of said coil being connected to said eighth terminal: a first diode having first and second diode terminals and poled in the direction of said second diode terminal, said first diode terminal being connected to said fifth terminal; a second Zener diode having first and second Zener diode terminals and poled in the direction of said second Zener diode terminal, said second Zener diode terminal being connected to said second diode terminal and said first Zener diode terminal to the other end of said coil; and a capacitor connected across said coil.

13. The combination of claim 12 wherein:

said fourth terminal of said pay station is connected to ground;

and said third terminal of said pay station is adapted to be connected to said ring line.

14. The combination of claim 13 wherein:

said Zener diode is adapted to conduct only upon the appearance of said coin collect signal at said tip line.

15. A circuit for use in disconnecting a telephone pay station from a central office, the pay station being of a type in which a predetermined amount of money or coinage is deposited for initiating and paying for a telephone call and in which first and second terminals of the pay station are adapted to be connected to tip and ring lines which connect the pay station to the central office, the central office containing an electronic switching system which is programmed to provide an initial calling period for the predetermined amount of money or coinage and which, prior to the end of the initial calling period, transmits over the tip line a coin collect signal for instructing the pay station to collect the deposited money or coinage, the circuit comprising:

fifth and sixth terminals adapted to be connected to said first and second terminals, respectively;

and disconnect circuit means connected to said fifth and sixth terminals and adapted to be responsive to said coin collect signal for disconnecting said second terminal from said ring line for a preselected amount of time sufficient to indicate an on-hook condition to said central office.

16. A circuit in accordance with claim 15 wherein:
said disconnect circuit means includes:
a switch means connected to said sixth terminal and adapted to be connected to said ring line and activating means connected to said fifth terminal for opening said switch means in response to said coin collect signal.

17. A circuit in accordance with claim 15 wherein:
said pay station includes third and fourth terminals; and said disconnect circuit means includes seventh and eighth terminals connected to said third and fourth terminals, respectively; a switch having first and second stationary contacts, a third contact movable between said first and second stationary contacts, and a coil for activating said movable contact, the second and third contacts being connected to the sixth and seventh terminals, respectively, and one end of said coil being connected to said eighth terminal; a first diode having first and second diode terminals and poled in the direction of said second diode terminal, said first diode terminal being connected to said fifth terminal; a second Zener diode having first and second Zener diode terminals and poled in the direction of said second Zener diode terminal, said second Zener diode terminal being connected to said second diode terminal and said first Zener diode terminal to the other end of said coil; and a capacitor connected across said coil.

18. A circuit in accordance with claim 17 wherein;
said eighth terminal of said disconnect circuit means is connected to ground;
and said seventh terminal of said disconnect circuit means is adapted to be connected to said ring line.

19. A circuit in accordance with claim 18 wherein:
said Zener diode is adapted to conduct only upon the appearance of said coin collect signal at said fifth terminal.

* * * * *